United States Patent [19]

Rangaswamy et al.

[11] Patent Number: 5,140,005

[45] Date of Patent: Aug. 18, 1992

[54] CERAMIC SUPERCONDUCTIVE POWDER

[75] Inventors: Subramaniam Rangaswamy, Stony Brook; Burton A. Kushner, Old Bethpage; Anthony J. Rotolico, Hauppauge, all of N.Y.

[73] Assignee: The Perkin-Elmer Corporation, Norwalk, Conn.

[21] Appl. No.: 152,181

[22] Filed: Feb. 4, 1988

[51] Int. Cl.$^5$ .......................... C01F 17/00; C01G 3/02
[52] U.S. Cl. ........................................ 505/1; 423/263; 423/593; 423/604; 505/779; 505/780; 505/725
[58] Field of Search ................... 505/1, 809, 822, 780, 505/779, 725; 264/5, 10, 13, 56, 63; 501/152; 106/287.35; 252/521; 423/21.1, 263, 593, 604, 635, 636, 637, 641; 427/223, 422, 423

[56] References Cited

U.S. PATENT DOCUMENTS

| | | |
|---|---|---|
| 3,171,714 | 3/1965 | Jones et al. |
| 3,278,655 | 10/1966 | Barr ........................................ 264/0.5 |
| 3,455,510 | 7/1969 | Rotolico . |
| 3,617,358 | 11/1971 | Dittrich ............................ 264/12 X |
| 3,974,245 | 8/1976 | Cheney et al. ........................ 264/10 |
| 4,654,075 | 3/1987 | Cipollini ............................ 75/0.5 A |

OTHER PUBLICATIONS

Bednorz et al., "Possible High $T_c$ Superconductivity in the Ba-La-Cu-O System", Z. Phys. B—Condensed Matter, 64, 189-193 (1986).
Cima et al., "Powder Processing for Microstructural Control in Ceramic Superconductors", A. Cer. Mat., vol. 2, No. 3B, 1987, pp. 329-335.
Johnson et al., "Preparation of Superconducting Powders by Freeze-Drying", A. Cer. Mat., vol. 2, No. 3B, 1987, pp. 337-342.
"Superconductor Research Pace Quickens", G. Fisher and M. Schober, Ceramic Bull., 66, 1087 (1987).
"Thermal Spraying Superconducting Oxide Coatings", J. P. Kirkland et al., Advanced Ceramic Materials, 2, No. 3B, Special Issue, 401 (1987).

*Primary Examiner*—Mary Lynn Theisen
*Attorney, Agent, or Firm*—H. S. Ingham; E. T. Grimes

[57] ABSTRACT

A superconductive oxide powder is produced by a method comprising spray drying a slip to form agglomerates, feeding the agglomerates sequentially through a first and a second oxygen supported combustion flame for fusing the fine particles in the agglomerates to form an intermediate powder, annealing the intermediate powder in an oxygen-containing environment such as to produce a friable mass, and crushing the mass to form the superconductive oxide powder. For example, a precursor compound in the slip is barium carbonate, the other precursor constituents are yttrium oxide and copper oxide, and the yttrium, barium and copper in atomic proportions in the precursor constituents are 1:2:3+Y where Y denotes a copper surplus having a value of up to about 1.5. In the final powder the proportions are 1:2:3+Z where Z is between about 0.2 and 1.0.

14 Claims, 1 Drawing Sheet

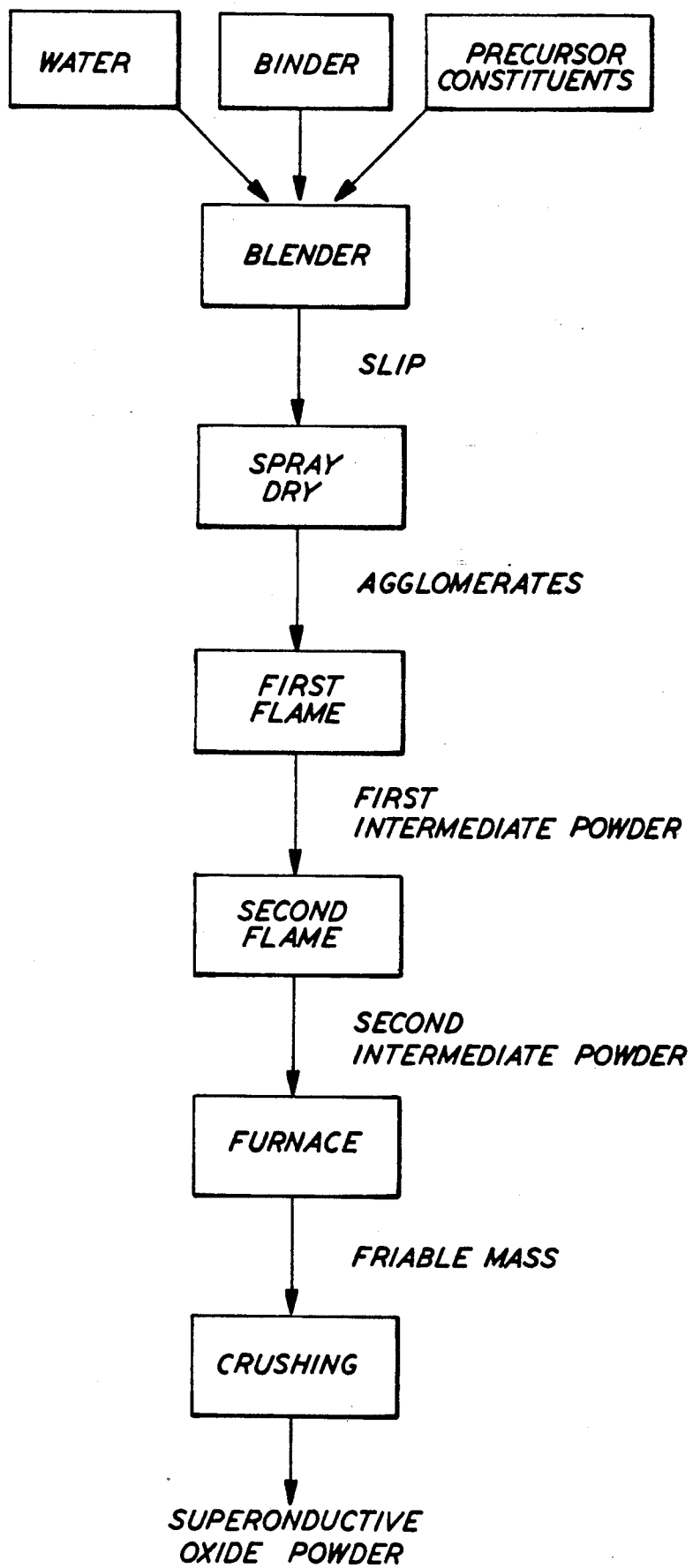

CERAMIC SUPERCONDUCTIVE POWDER

The present invention relates to the field of superconductors and particularly to a superconductive oxide powder and to a method of making same.

BACKGROUND OF THE INVENTION

Recent advances in the field of superconductors have particularly involved certain oxide ceramic compositions that exhibit superconductive properties at temperatures approaching liquid nitrogen temperature (77° K.) and higher. The first publication was by International Business Machines' Zurich Research Laboratory in Apr. 1986 for the oxide composition of barium, lanthanum and copper.

Subsequently scientists at the University of Houston discovered a better composition consisting of yttrium oxide, barium oxide, and copper oxide in the atomic proportions 1,2,3 (and thereby known as "1-2-3 composition") with the nominal formula $YBa_2Cu_3O_{7-x}$. More broadly, an orthorhombic pervoskite crystal structure has been recognized as the basis for superconductive oxides. The problem of preparing shapes and samples of such oxide materials immediately became apparent, and plasma spraying of coatings was recognized as a viable method. There have been numerous publications pertaining to these developments; typical references are as follows: "Superconductor Research Pace Quickens" G. Fisher and M. Schober, Ceramic Bul. 66, 1087 (1987); "Thermal Spraying Superconducting Oxide Coatings", J. P. Kirkland et al, Advanced Ceramic Materials 2, No. 3B Special Issue, 401 (1987).

However, realization of full potential for superconductive properties has remained elusive. The superconductivity has been incomplete and lacking in reproducibility. The problem of sufficient and reliable superconductivity, for example in plasma sprayed coatings, has been traced broadly to the quality of the superconductive powder utilized, particularly the stoichiometry of constituents including oxygen and the presence of contaminants. Details are not very well understood. Superconductive ceramics such as the 1-2-3 type are particularly susceptible to reduction of the oxide. A further problem is that superconductivity is detrimentally sensitive to effects in grain boundaries which are inherent from the processing. Subsequent annealing of the material in oxygen helps, but with only some improvement.

Since there remains a lack of understanding of the superconductivity phenomenon in ceramics, the materials depend on and are still best defined by method of production. One common method of making powder involves laborious steps of milling, grinding, calcining, sintering, annealing, and crushing. These difficulties have resulted in a practical inability to manufacture such materials in large quantities. Also, sintering methods do not effect complete homogeneity, which could result in less than optimal superconductive properties.

Several currently known solution chemistry techniques are being explored, but do not appear to have resulted in the production of large quantities of superconductive powder. Additionally, powders made by solution techniques are generally in the 1-2 micron range. An example of a chemical processing method for producing a powder is disclosed in U.S. Pat. No. 4,654,075 (Cipollini).

Thermal sprayable multi-component ceramic powders can be made by the spray drying process such as is described in U.S. Pat. No. 3,617,358 (Dittrich). While this method enables production of large quantities of powders, the constituents of such powders are not alloyed, and there have been difficulties in obtaining a superconductive coating. Coatings deposited from spray dried composite powders are inhomogeneous and require extended heat treatments at 950°0 C. that often degrade the substrate and also do not produce consistently reproducible superconducting coatings. It is also known to further process the spray dried powder by passing it through an arc plasma gun as disclosed in U.S. Pat. No. 3,974,245 (Cheney et al). However it has been found that, in the case of superconducting compositions, this process step results in powders that are deficient in oxygen and, also, cation ratios are substantially altered due to selected evaporation. The spray dried superconducting ceramics further present severe practical difficulties in plasma processing due to powder port and nozzle build up and result in very low yields and a poor quality powder.

Similarly it is known to spheroidize granular refractory oxides. U.S. Pat. No. 3,278,655 (Barr) teaches such spheroidizing of uranium oxide with an additive in a combustion flame. U.S. Pat. No. 3,171,714 (Jones et al) concerns spheroidizing granular plutonium oxide in an oxygen enriched induction plasma. Problems of retaining cation ratios in the high temperature plasma, and even in a combustion flame, are similar to those of a DC plasma. A related problem is further change in cation ratio during the subsequent thermal spray coating process.

Therefore an object of the present invention is to provide a novel method of producing superconductive powder. A further object is to provide an improved superconductive powder. An additional object is to produce thermal spray powders for the deposition of improved superconductive coatings Another object of the invention is to enable large scale manufacture of the said powder. Yet a further object of the invention is to prepare powders having a desired chemistry and size and with sphericity for good flowability. Yet another object is to obtain a powder with the desirable superconductive orthorhombic crystal structure.

SUMMARY OF THE INVENTION

The foregoing and other objects of the present invention are achieved with a superconductive oxide powder, and a method of making same, wherein the superconductive oxide powder is characterized by homogeneity and a crystalline structure favoring superconductive properties. The powder is produced by a method comprising the steps of forming a slip containing a spray dry binder and fine particles of at least one precursor constituent for a superconductive oxide, spray drying the slip to form spray dried agglomerates of the precursor constituent, feeding the spray dried agglomerates through a first oxygen supported combustion flame having sufficient heat content for alloying the fine particles in the spray dried agglomerates to form an intermediate powder, annealing the intermediate powder in an oxygen-containing environment such as to produce a friable mass of superconductive material, and crushing the friable mass to form the superconductive oxide powder.

Preferably the method further comprises the step of feeding the intermediate powder through a second oxygen supported flame having sufficient heat content to further alloy the intermediate powder. This step particularly applies where the superconductive oxide is formed of at least one cation component and the precursor constituent includes a heat-decomposable compound of the cation component with a non-oxygen component. The first combustion flame should have sufficient heat content and sufficient oxygen content to at least partially decompose the compound and at least partially oxidize the cation component in the intermediate powder and to remove a portion of the non-oxygen component from the intermediate powder, and the second combustion flame should have sufficient heat content and sufficient oxygen content to remove a further portion of the non-oxygen component from the intermediate powder.

As an example, the compound is barium carbonate, the other precursor constituents are yttrium oxide and copper oxide, and the superconductive oxide comprises oxygen combined with three cation components consisting of yttrium, barium and copper in atomic proportions 1:2:3.

In certain cases the superconductive oxide comprises preselected proportions of a plurality of cation components and the precursor constituents comprise corresponding precursor compounds of the cations components, at least one cation component being susceptible to a measurable loss in proportion relative to the cation components resulting from the feeding of the spray dried agglomerates through the combustion flame. In such case, the method preferably further comprises an initial step of selecting proportions of the precursor constituents with a surplus of the at least one cation constituent, the surplus being equal to the measurable loss whereby the superconductive oxide powder is formed of the preselected proportions. In a specific such case the superconductive oxide is formed from three cation components consisting of yttrium, barium and copper in atomic proportions in the precursor constituents of 1:2:3+Y where Y denotes a copper surplus having atomic value of up to about 1.5.

BRIEF DESCRIPTION OF THE DRAWING

The drawing is a flow diagram showing steps of the method of the present invention.

DETAILED DESCRIPTION OF THE INVENTION

Superconductive oxide powder of the present invention is preferably of the type having a critical temperature for superconductivity above the liquid-gas transition temperature for nitrogen, i.e. the powder becomes superconductive above 77° K. ("high temperature superconductor"). The present invention particularly pertains to multicomponent oxide ceramics having an oxygen deficient orthorhombic pervoskite crystal structure. The oxide of such powder is susceptible to becoming deficient in oxygen. The degree and reliability of superconductivity are quite sensitive to such deficiencies as well as to exact crystalline structure, ratios of the constituents and apparently other, as-yet unknown, factors related to processing of the powder.

It has been discovered that if oxide powder of the superconductive type is produced according to the method described herein the material produced is more reliably superconductive. As the subtleties of oxide structure have yet to be characterized, the material of the invention is described in terms of the method of production. This method is shown schematically in the flow diagram of FIG. 1.

Precursor constituents in fine particle form are chosen according to the desired superconductive oxide of selected cation constituents. The particles should be −44 microns and preferably −20 microns 30 1 micron. Desirably the constituents are chosen to produce known type copper oxide base superconductive compositions containing at least one additional cation constituent. An example is of the general formula $R_aT_bCu_cO_d$, where cation Cu is copper, cation T is a barium, or barium with up to about 7 at % of at least one additional metal sodium, potassium, strontium, rubedium, and/or cesium, the 7 at % being based on the total of barium and any replacement thereof. Cation R is at least one element selected from the group consisting of yttrium, ytterbium, neodymium, samarium, europium, gadolinium, holmium, erbium, dysprosium, lanthanum, lutecium and thulium.

The atomic proportions a, b and c are nominally 1, 2 and 3 respectively, and d has a value between about 6.5 and 7. A specific preference is a composition of the formula $Y_1Ba_2CU_{37-X}$, known as "1-2-3". The "X" denotes a small oxygen deficiency, and may have a value as high as 0.5; thus oxygen atomic proportion in the formula may be between 6.5 and 7.

For optimum control of the chemistry it is preferable that the precursor constituents comprise individual oxides or other convenient, decomposable compound of the cation constituents. In the case of the 1-2-3 composition, copper oxide and yttrium oxide are quite suitable. However, barium oxide is considered to be toxic and a safer precursor is barium carbonate in fine powder form. The present invention is especially suited to the processing of such compound precursors. It is also possible to partially replace the atomic proportion of the oxygen with at least one element selected from the group consisting of fluorine and sulfur such that the general formula is $R_aT_bCu_cO_dX_e$ where X is fluorine and/or sulfur, and e has a value of up to 0.3. An alternative composition may be based on an oxide of bismuth, aluminum, strontium, calcium and copper.

Referring again to FIG. 1, the precursors are mixed in a blender with a liquid vehicle, which may be alcohol or the like but preferably is water, and a binder The binder is a spray dry type, namely a binder that may be subsequently decomposed and combusted or evaporated away or incorporated into the final product as required. Suitable binders and slip preparation are described in aforementioned U.S. Pat. No. 3,617,358. Some examples of binders are sodium carboxyl methyl cellulose (CMC) and polyvinyl pyrrolidone. Generally the amount of binder is in the range of 1 to 3% by weight of the precursor constituents, and preferably about 1.5 to 2.5%. The liquid vehicle should be between 0.15 and 0.2cc for each gram of precursor. A wetting agent and/or other conventional minor additive may be added as needed.

The slip is then spray dried in the conventional manner, for example as described in the above-mentioned patent. The slip is thus atomized and dried into spray dried agglomerates with the water evaporated while the agglomerates pass through an oven temperature of 100 to 300° C. which also cures, dries or sets the binder. The agglomerates have a size broadly in the range of −100 mesh (−150 microns) +5 microns which may be separated conventionally into two size components, e.g. divided at about 44 microns, by a cyclone attachment to the spray dryer. The agglomerates are thus formed of the fine particles of the precursors.

The spray dried agglomerates are next fed through an oxygen supported combustion flame having sufficient heat content to alloy the fine particles in the agglomerates and thereby form a first intermediate powder of similar size. The intermediate powder is allowed to travel sufficient distance from the flame in air (or oxygen enriched) atmosphere for cooling, to retain a spheroidal shape of the solidified powder particles which are collected in a drum or the like. Preferably the particles are fully fused by the flame forming spheroidal particles. The flame temperature is also sufficient to burn off the binder and any additive unless, alternatively, the binder contains an oxide or the like that fuses with the other oxide constituents to form the intermediate powder. In the case of such an oxide-containing binder the binder serves as one of the precursors.

The heat content and oxygen content of the flame also should be sufficient to at least partially decompose any non-oxide precursor compound and oxidize the corresponding cation. An oxygen supported acetylene flame is generally quite suitable. The combustion gas may be any other hydrocarbon with a sufficient flame temperature to decompose any precursor compound and fuse the powder, without overheating to cause excessive loss of oxide. For sufficient oxygen the gas balance should be at least stoichiometric and preferably the oxygen to fuel ratio is between 1:1 and 5:1.

A suitable combustion flame is provided by a flame spray gun, for example of the general type described in U.S. Pat. No. 3,455,510 (Rotolico) such as a Metco 6PII Gun connected to a Metco 3MP Powder Feeder, the gun and feeder being sold by The Perkin-Elmer Corporation, Norwalk, Ct. A higher rate of processing in a combustion flame may be effected in a larger torch device based on scaling up such a gun.

In a desirable embodiment of the method of the present invention, and the powder made thereby, additional oxygen is provided to the combustion flame in the form of a shroud gas surrounding the flame. This oxygen shrouding may be effected with the flame spray gun of aforementioned U.S. Pat. No. 3,455,510, specifically the ring of converging jets for auxiliary gas disclosed therein with respect to the nozzle. Generally the added oxygen may be at least equal to the oxygen mixed with the fuel in the gun, for example up to five times the mixed oxygen.

The intermediate powder at this stage may be annealed directly as described below, but preferably is passed through a second combustion flame. This second flame may be from the same gun or other combustion device as the first flame (at a later time), or may be generated by a second flame device in tandem, e.g., for continuous processing. In the case of 1-2-3 material with barium carbonate precursor it was found that about 2wt % carbon remained in the intermediate powder after the first pass through the flame. The carbon is not easily removed by the annealing step and is suspected of interfering with superconductivity.

It was discovered, according to the present invention, that a second pass through a combustion flame reduces the carbon content to less than about 0.5wt % and, more importantly, the superconductive properties of the powder become substantially improved and more reliable. Further passes through such a flame may be desired to even further enhance superconductivity, particularly if the powder is to be used without further fusing (such as by thermal spraying).

The second intermediate powder is then treated by annealing in an oxygen-containing furnace in the conventional manner. The partial pressure of oxygen is in the range of 0.2 (air) to 1.0 (pure oxygen) and the annealing temperature is 890° C. to 950° C. Annealing time is 2 to 45 hours at temperature followed by slow cooling at 1-2° C./min. Specifics are selected so as to form a friable mass of particles of the desired crystal structure and with substantially full oxidation. For example, annealing is done in pure oxygen at 930° C. for 5 hours The annealed material is generally in the form of a friable mass of superconductive material, as there is likely to be some light sintering of the powder particles together resulting from the annealing step. The friable mass is crushed by any convenient method such as with mortar and pestle, rollers or the like. Preferably the crushing is effected sufficiently gently so as to retain spheroidal shape of the powder particles, thus obtaining a free flowing powder.

The powders herein may be used as-is or sintered into shapes. However, the powders are especially useful for thermal spraying, particularly with a plasma gun. However, the powders alternatively may be used as-is, being superconductive, or may be processed by fusing together or sintering or the like into a desired shape.

If the powder is thermal sprayed there will again be some loss of oxygen and change in crystal structure since the particles are remelted and quenched on the workpiece. Therefore, a further anneal of the initial coating may be required. This is effected in the same manner as described above for the powder production method, and results in a superconductive coating.

In the case of a 1:2:3 composition, it was found that there is a measurable loss in proportion of copper in the final powder relative to the other cation components This is apparently due to selective evaporation of components, and is expected to occur generally wherever there is a plurality of cation components in which at least one has a significantly higher effective vapor pressure.

Therefore, according to a further embodiment of the present invention, the proportions of precursor constituents are selected initially with a surplus of the cation constituent having the measurable loss, the surplus being equal to the measurable loss. In the case of 1-2-3 a measurable relative copper loss of 0.5 is typical, so the surplus is 0.5; vis. the atomic proportion of copper in the precursor constituents, relative to the other cations, is 3.5. More broadly, the atomic ratios of the cations in the precursors for the 1:2:3 type material are expressed as $1:2:3+Y$ where Y has a value of up to about 1.5 and is preferably between about 0.5 and 1.0, depending on the exact amount of measurable loss determined for the specific processing conditions and particularly for the effect of the one or two combustion flame steps. The resulting superconductive oxide powder then has the selected composition of 1:2:3. Other oxide superconductors may show a similar problem, and in any such case a measurable loss is determined after carrying out the steps of the invention to produce powder, and a new powder is made with an initial surplus of cation equal to the measurable loss.

If the superconductive oxide powder is to be thermal sprayed to produce a superconductive coating, further loss of a cation may occur. Therefore, it is within the above further embodiment of the present invention that the selected composition of the superconductive powder may itself have a selected composition with a surplus of at least one cation to compensate for the further loss. Thus, for the nominal 1-2-3 type material, the final (thermal sprayable) powder may have a selected cation ratio of 1:2:3+Z where Z has an atomic value of up to 1.0 and preferably between 0.2 and 0.8, depending on expected thermal spray conditions. The value of Z will reflect a compensation for the losses during thermal spraying. Thus, the above-indicated ranges for Y reflect a double compensation for the losses during production of the powder and thermal spraying.

There are several known methods for measuring for the superconducting property of the coating article, including Meissner effect, and measurements of critical current Jc, critical temperature Tc and magnetic susceptibility Hc. The preferred crystal structure may be determined by X-ray diffraction. A desirable method is simply observation of the Meissner effect. This technique is relatively straightforward in that the coating is observed to levitate a magnet when cooled in liquid nitrogen. This experiment shows that the coating is, in fact, a high Tc superconductor with an onset temperature above 77° K. (liquid nitrogen temperature). The measurement is effected at an appropriate temperature for superconductivity, such as with liquid nitrogen, or with a varying temperature to determine superconducting transition point (Tc).

The following are examples of carrying out the method of the present invention to produce a powder of the present invention.

EXAMPLE 1

An yttrium-barium-copper oxide powder was produced with precursor constituents in quantities corresponding to initial atomic cation ratios of 1:2:3. Specifically, a slip was made as follows:

| | |
|---|---|
| $Y_2O_3$ | 685 gms |
| $BaCO_3$ | 2409 gms |
| CuO | 1442 gms |
| | 4536 gms |
| 10% CMC soln | 910 gms |
| NOPCOSPERSE 44 | 90 gms |
| Distilled water | 750 ml |

(NOPCOSPERSE (TM) is a dispersion agent sold by Diamond Shamrock, Morristown, N.J.)

The slip was emulsified and spray dried under the following conditions.

| | |
|---|---|
| Nozzle diameter | 2.25 inches (5.7 cm) |
| Air Flow/pressure | 33 1/sec/2.3 bar |
| Pump Pressure in/out | 1 bar/2 bar |
| Temp. in/out (°C.) | 250/150 |

The resulting coarse and fine fractions gave a combined yield of about 80% of spherical, free flowing, agglomerated powder.

The spray dried agglomerates were fused using a Metco Type 6PII combustion spray gun at the following settings:

| | |
|---|---|
| Nozzle: | 6P7C-M |
| Pressures (bar): | $O_2$ - 2.7 |
| | Acetylene - 1 |
| | Air - 1.3 |
| Flows (l/min): | $O_2$ - 51 |
| | Acetylene - 29 |
| Powder Feeder: | Metco 3MP |
| Carrier ($O_2$) | 3.3 bar/4.7 l/min |

The combustion processed powder, upon cooling in the spray stream, was again fused with the combustion spray gun, and collected in a separate vessel. The resulting intermediate powder appeared spherical, uniform and black as desired with a yield of about 90%.

The combustion processed, intermediate powder was annealed at 945° C. for 6 hours, then cooled at 1-2° C./min. The resulting cake was broken up by gentle crushing with a mortar and pestle. The resulting spheroidal powder revealed the desirable orthorhombic structure by X-ray diffraction. Chemical analysis of the powder indicated significantly reduced carbon contamination to about 0.25, and atomic proportions of yttrium, barium and copper, were 1:2:2.5, reflecting a measurable loss of copper of 0.5.

EXAMPLE 2

The Example 1 was repeated with precursor constituents corresponding to initial atomic cation ratios of 1:2:3.5, to compensate for the copper loss in Example 1. Specifically, a slip was made with the following precursor constituents:

| | |
|---|---|
| $Y_2O_3$ | 653 gms |
| $BaCO_3$ | 2277 gms |
| CuO | 1606 gms |
| | 4536 gms |

The further constituents (such as CMC binder) and processing were the same as for Example 1. The resulting superconductive oxide powder had the selected actual atomic proportions of 1:2:3. The plasma sprayed coating had cation ratios of 1:2:2.5.

EXAMPLE 3

The Example 1 was repeated with precursor constituents corresponding to initial atomic cation ratios of 1:2:4, to compensate for the further copper loss in Example 2. Specifically, a slip was made with the following precursor constituents:

| | |
|---|---|
| $Y_2O_3$ | 620 gms |
| $BaCO_3$ | 2168 gms |
| CuO | 1748 gms |
| | 4536 gms |

The further constituents (such as CMC binder) and processing were the same as for Example 1. The resulting superconductive oxide powder had the selected actual atomic proportions of 1:2:3.5. This powder was then plasma sprayed with a Metco Type 7MB Gun with a 706 nozzle, No. 2 powder port, argon at 5 bar and 38 1/min 1000 amperes, 35 volts, 6.4 cm spray distance, spray rate 0.9-1.4 kg/hr. The annealing step described above was then repeated on the coating. The oxide coating produced had yttrium, barium and copper in ratios of 1:2:3 and exhibited desirable crystal structure and excellent superconductive properties in liquid nitrogen as exhibited by the Meissner effect.

EXAMPLE 4

A superconductive type of oxide powder corresponding to the formula $YbBa_{1.93}Sr_{0.07}Cu_3O_{7-x}$ is produced using the method described in Example 1. Precursor constituents for the slip are as follows:

| | |
|---|---|
| $Yb_2O_3$ | 1084 gms |
| $BaCO_3$ | 2094 gms |
| $SrO_2$ | 45 gms |
| CuO | 1313 gms |
| | 4536 gms |

Results similar to those of Example 1 are attained.

EXAMPLE 5

Example 1 is repeated with the Metco Type 6PII combustion spray gun using oxygen shroud gas flow through the ring of converging auxiliary jets in the nozzle. The shroud oxygen is supplied at 2.7 bar and 100 l/min. Similar powder is obtained which has a higher oxygen content than the powder of Example 1.

Superconductive powders produced according to the present invention are unique in comparison to such powder produced according to other methods, even with the same starting ingredients and proportions. Powders are fully alloyed, spheroidal, properly stoichiometric (or selectively off-stoichiometric) and relatively free of precursor contaminants (e.g. carbon). Crystalline structural details are apparently dependent directly on the processing steps.

Applications are any that may be associated with superconductive materials, particularly of the "high temperature" type. These include electrical conductors, magnets and electromagnetic sensors, and may be incorporated into solid state devices such as Josephson junction diodes.

While the invention has been described above in detail with reference to specific embodiments, various changes and modifications which fall within the spirit of the invention and scope of the appended claims will become apparent to those skilled in this art. The invention is therefore only intended to be limited by the appended claims or their equivalents.

What is claimed is:

1. A powder useful for producing superconductive coatings by thermal spraying, comprising an oxide defined by the formula $R_aT_bCu_cO_d$ or $R_aT_bCu_cO_dX_e$, where H is at least one element selected from the group consisting of yttrium, ytterbium, neodymium, samarium, europium, gadolinium, holmium, erbium, dysprosium, lanthanum, lutecium and thulium, T is barium with 0 to 7 at % of an additional metal, the at % being based on the total of the barium and the additional metal and the addition metal being selected from the group consisting of sodium, potassium, rubidium, cesium and combinations thereof, Cu is copper, O is oxygen, X is fluorine, sulfur or a combination thereof, a and b are nominally 1 and 2 respectively, c is between about 3.2 and 4.0, the total of d and known as "1-2-3". The "X" denotes a small oxygen deficiency, and e is between about 6.5 and 7, and e is up to 0.3;

wherein the powder is produced by a method comprising the steps of forming a slip containing a spray dry binder and fine particles of at least one precursor constituent selected for forming a superconductive oxide, spray drying the slip to form spray dried agglomerates of the fine particles, feeding the spray dried agglomerates through a first oxygen supported combustion flame having sufficient heat content for alloying the fine particles in the spray dried agglomerates to form an intermediate powder annealing the intermediate powder in an oxygen-containing environment such as to produce a friable mass of material, and crushing the friable mass to form the powder.

2. A powder according to claim 1 wherein, according to the method, the combustion flame has sufficient heat content to fuse the fine particles in the spray dried agglomerates.

3. A powder according to claim 1 wherein, according to the method, the combustion flame is surrounded with oxygen shroud gas.

4. A powder according to claim 1 wherein the intermediate powder comprises intermediate particles of spheroidal shape, and the step of crushing the friable mass is effected sufficiently gently to form the powder as powder particles having substantially the spheroidal shape.

5. A powder according to claim 1 wherein the method further comprises the step of feeding the intermediate powder through a second oxygen supported combustion flame having sufficient heat content for further alloying the intermediate powder.

6. A powder according to claim 5 wherein the powder comprises at least one cation component of a superconductive oxide, the at least one precursor constituent includes a heat-decomposable compound of the cation component with a non-oxygen component, the first combustion flame has sufficient heat content and sufficient oxygen content for at least partially decomposing the compound and for at least partially oxidizing the cation component in the intermediate powder and for removing a portion of the non-oxygen component from the intermediate powder, and the second combustion flame has sufficient heat content and sufficient oxygen content for removing a further portion of the non-oxygen component from the intermediate powder.

7. A powder according to claim 1 wherein the powder comprises at least one cation component of a superconductive oxide, the precursor constituent includes a heat-decomposable compound of the cation component with a non-oxygen component, and the combustion flame has sufficient heat content and sufficient oxygen content for at least partially decomposing the compound, and for forming an oxide of the cation component in the intermediate powder and for removing at least a portion of the non-oxygen component from the intermediate powder.

8. A powder according to claim 7 wherein the compound is a carbonate with the non-oxygen component being carbon.

9. A powder according to claim 8 wherein the carbonate is barium carbonate.

10. A powder according to claim 1 wherein the slip is formed with a plurality of precursor constituents.

11. A powder according to claim 10 wherein the powder comprises preselected proportions of a plurality of cation components of a superconductive oxide and the precursor constituents comprise corresponding precursor compounds of the cations components, at least one cation component bein susceptible to a measurable loss in proportion relative to the cation components resulting from the feeding of the spray dried agglomerates through the combustion flame, and the method further comprises an initial step of selecting proportions of the precursor constituents with a equal to the measurable loss whereby the powder is formed of the preselected proportions.

12. A powder according to claim 1 wherein the oxide is defined by the formula $R_aT_bCu_cO_d$ where R is yttrium and T is barium.

13. A powder useful for producing superconductive coatings by thermal spraying, comprising an oxide defined by the formula $R_aT_bCu_cO_d$ or $R_aT_bCu_cO_dX_e$, where H is at least one element selected from the group consisting of yttrium, ytterbium, neodymium, samarium, europium, gadolinium, holmium, erbium, dysprosium, lanthanum, lutecium and thulium, T is barium with 0 to 7 at % of an additional metal, the at % being based on the total of the barium and the additional metal and the addition metal being selected from the group consisting of sodium, potassium, rubidium, cesium and combinations thereof, Cu is copper, O is oxygen, X is fluorine, sulfur or a combination thereof, a and b are nominally 1 and 2 respectively, c is between about 3.2 and 4.0, the total of d and e is between about 6.5 and 7, and e is up to 0.3.

14. A powder according to claim 13 wherein the oxide is defined by the formula $R_aT_bCu_cO_d$ where R is yttrium and T is barium.

* * * * *

UNITED STATES PATENT OFFICE
CERTIFICATE OF CORRECTION

Patent No. 5,140,005    Dated August 18, 1992

Inventor(s) Subramaniam Rangaswamy, Burton A. Kushner, Anthony J. Rotolico

It is certified that error appears in the above-identified patent and that said Letters Patent is hereby corrected as shown below:

In column 2, line 7, after "950°" delete "O".

In column 4, line 4, change "30 1" to --+1--.

In column 4, line 21, change the formula "$Y_1Ba_2CU_{37-X}$" to --$Y_1Ba_2Cu_3O_{7-X}$--.

In column 9, line 48, after "X" change the subscript "c" to subscript --e--.

In column 9, line 49, change "H" to --R--.

In column 9, lines 60-61, delete --known as "1-2-3". The "X" denotes a small oxygen deficiency, and--.

In column 11, line 2, before "equal" insert --surplus of the at least one cation component, the surplus being--.

UNITED STATES PATENT AND TRADEMARK OFFICE
CERTIFICATE OF CORRECTION

PATENT NO. : 5,140,005
DATED : August 18, 1992
INVENTOR(S) : Subramaniam Rangaswamy, et al.

It is certified that error appears in the above-indentified patent and that said Letters Patent is hereby corrected as shown below:

In column 11, line 11, change "H" to --R--.

Signed and Sealed this

Fifteenth Day of February, 1994

Attest:

BRUCE LEHMAN

Attesting Officer    Commissioner of Patents and Trademarks